Figure 1:
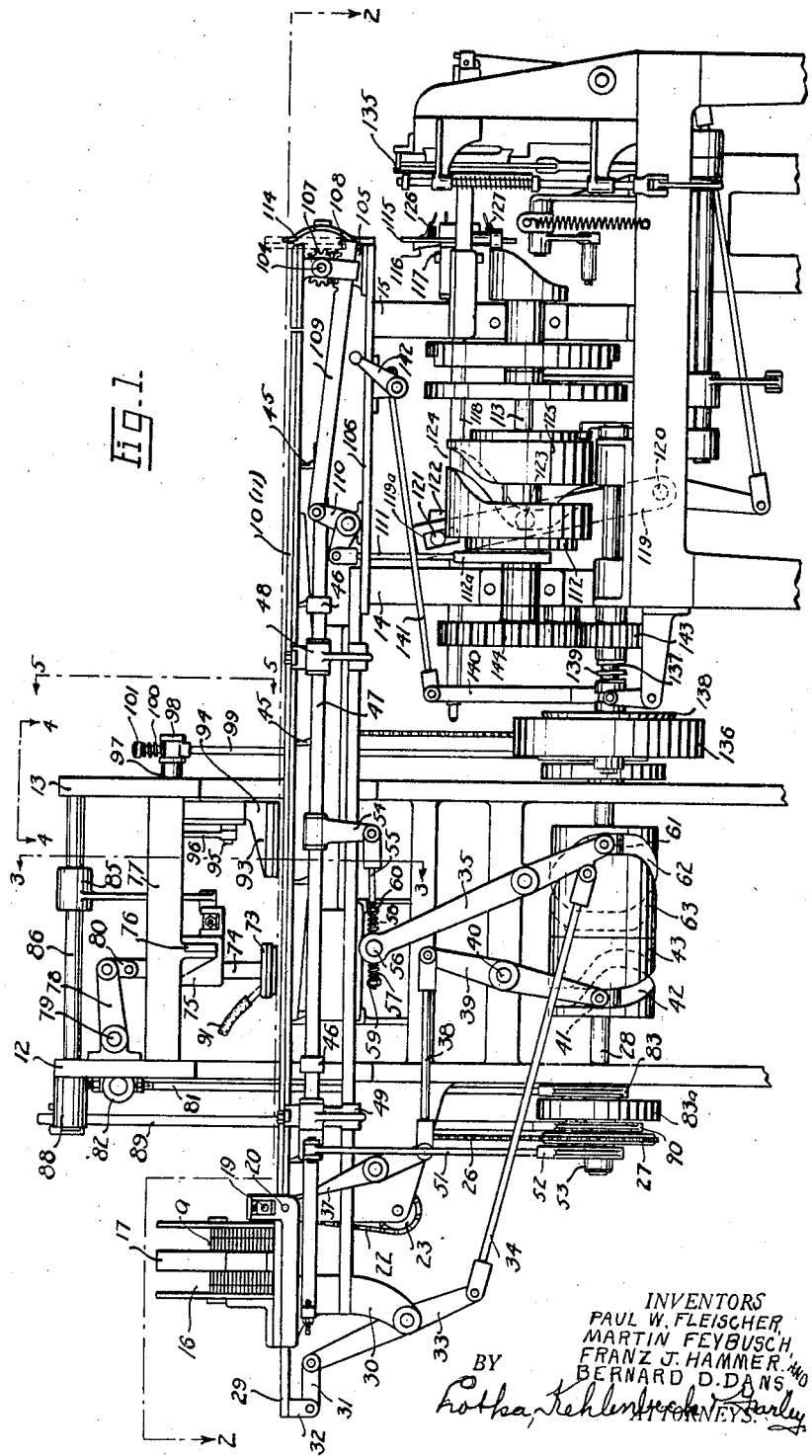

Sept. 1, 1931.  P. W. FLEISCHER ET AL  1,821,701

BOX MAKING MACHINERY

Filed June 7, 1928   5 Sheets-Sheet 3

INVENTORS
PAUL W. FLEISCHER
MARTIN FEYBUSCH
BY FRANZ J. HAMMER
BERNARD D. DANS
ATTORNEYS

INVENTORS
PAUL W. FLEISCHER,
MARTIN FEYBUSCH,
BY FRANZ J. HAMMER,
BERNARD D. DAVIS
ATTORNEYS.

INVENTORS,
PAUL W. FLEISCHER,
MARTIN FEYBUSCH,
BY FRANZ J. HAMMER,
BERNARD D. DANS,
ATTORNEYS.

Patented Sept. 1, 1931

1,821,701

UNITED STATES PATENT OFFICE

PAUL W. FLEISCHER, OF WEEHAWKEN, NEW JERSEY, MARTIN FEYBUSCH AND FRANZ J. HAMMER, OF NEW YORK, AND BERNARD D. DANS, OF BROOKLYN, NEW YORK, ASSIGNORS TO NEW JERSEY MACHINE CORPORATION, OF HOBOKEN, NEW JERSEY, A CORPORATION OF NEW JERSEY

BOX MAKING MACHINERY

Application filed June 7, 1928. Serial No. 283,502.

The present invention relates to the art of making covered paper or pasteboard boxes of that type wherein the box shell has an externally applied top of plain, printed or decorated material, extending over the top and slightly down the end and side walls of the shell, and a covering strip consisting of either a single or plurality of strips, one edge of which is positioned so as to be at the juncture of the top and flange portions of the shell, the outer edge of the strip generally being inturned over the edge of, and adhesively affixed to the inner faces of the side and end walls of the shell. In some instances, however, the covering strip is simply applied to the exterior of the box. This class of box is generally known as the blanket top box, due to the application of the top being quite similar to that of a blanket, i. e. covering the entire top and reaching down on the sides. This type is sometimes known by one of the following names: pinch top, turn over top or half wrapped.

Boxes of this type have heretofore been manufactured by first "breaking" the flanges of the box shell along score lines to give it a more or less "set-up" form. The box shell was then registered by hand on the adhesively coated top after which the marginal portions of the top were affixed to the flanges of the shell either by rubbing such portions down by hand upon the flanges, or by placing the box shell with the top attached thereto in a machine which performed the operation of fixing the marginal portions of the top to the flanges of the box shell. The next operation consisted in taking the box shell which would be in "set-up" form, resulting from the above treatment, and placing it on a form whereon the covering strip was applied. The stripped box was then removed from the form and the operation of turning in the outer edges of the covering strip to secure such edges to the inner faces of the box flanges was performed by hand. From the above it will be seen that the manufacture of blanket top boxes was almost entirely performed by a series of hand operations.

It is the principal object of the present invention to improve upon the methods heretofore employed for the manufacture of blanket top boxes and to simplify the procedure by reducing as much as possible the number of steps performed in the production of such boxes.

Another very important object of the present invention resides in the development of a method of procedure such that comparatively simple mechanisms may be associated in operative relationship in an automatic machine or apparatus whereby blanket top boxes, heretofore made only by hand, can be not only much more rapidly and cheaply manufactured but in addition, a product of better appearance secured.

A further object is to provide a construction of an apparatus for the manufacture of blanket top boxes that will possess to a marked extent the features of flexibility and ease of adjustment with respect to changing over the machine for the manufacture of boxes of different sizes and shapes; such features being highly advantageous in a machine which is intended to operate as a continuous production apparatus on a commercial basis in an industry such as the box making one where the sizes and shapes of the articles manufactured vary widely.

In addition to simplifying greatly the prevailing method of manufacture, other objects of the present invention are to reduce wastage due to inaccuracies resulting from hand operation, eliminate the necessity of transporting partially finished box elements from one machine to another and thereby reduce labor costs, and to greatly increase the rate of production and therefore materially reduce the cost of the finished product.

Another object is to so construct an apparatus for the manufacture of boxes of the type to which the present invention relates that the number of parts required to be changed when altering the setting of the machine from one size or shape of box to another is comparatively few, and to so construct the parts which are required to be changed that they are quite inexpensive to manufacture, thereby avoiding the necessity for large expenditures for machine parts and thus allowing the machine to be utilized economically for small runs of boxes of various sizes.

A particular advantage of the present method of making boxes is that it lends itself with ease to the manufacture of odd shaped boxes with the same equipment that is used for rectangular boxes without any change of the structural parts of the machines. The only changes required are the same as those required when changing from one rectangular box to a rectangular box of different size. The making of fully covered paper boxes of odd shapes has heretofore been difficult as the old processes can not readily accommodate other than rectangular boxes. Heretofore the manufacture of fully covered odd shaped boxes has not been carried out as a continuous automatic operation in a single unit.

Briefly stated the present invention depends upon an improved simplified method of procedure which consists in adhesively assembling the box shell blank and the paper top in superimposed relationship, while both the blank and top are in a substantially flat condition, the marginal portion of the top being affixed to the flange portion of the box shell blank while both members are maintained in such flat condition, in contradistinction to the former methods wherein the flange portions of the blank were folded up along the score lines before the box blank and top were adhesively assembled. Before the adhesive has had time to set thoroughly, the flange portions of the blank with the marginal portions of the top adhered thereto are folded or bent up along the score lines into the final set-up position. The time allowed between the adhesive application of the top of the box shell blank and the setting-up of the blank is such as to permit the marginal portions of the top which are attached to the flange portions of the blank to slip or shift as tension is created in the top due to the bending over of the flanges, it being understood that the setting-up operation is performed before the adhesive has "set" or "tacked" to such an extent as to cause the paper top to tear or crack along the folding lines when the bending up of the flanges is performed. The operation of stripping is then completed while the box shell is held squarely and firmly on a box form. This operation is preferably performed by a covering or stripping machine of the type shown in Letters Patent of the United States No. 1,468,146 granted September 18, 1923, to Martin Feybusch and Sigurd Severson. The application of the binding strip in a machine of the type shown in such Letters Patent enables a finished product to be secured that was unobtainable by the hand methods heretofore employed. The character of the product secured by the present invention is particularly better than the handmade products in the type of boxes commonly known as "trimmed" work, wherein a plurality of covering strips are used in order to obtain a striped effect along the edges of the box.

Other objects and advantages of the present invention will appear more fully from the following more detailed description and by reference to the accompanying drawings forming a part hereof wherein a satisfactory constructional example of an apparatus is disclosed for the purpose of illustrating the principles of the invention and wherein Fig. 1 is a front elevation of such an apparatus; Figs. 2, 3, 4 and 5 are sections on the lines 2—2, 3—3, 4—4 and 5—5 of Fig. 1; and Figs. 6 to 11 inclusive, are perspective views showing the steps of the method performed according to the principles of the present invention.

Figure 12:
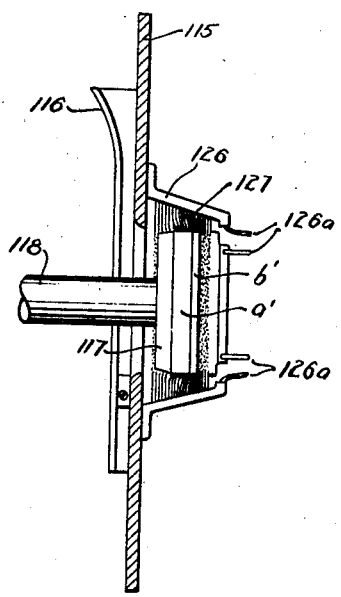
Figure 5:
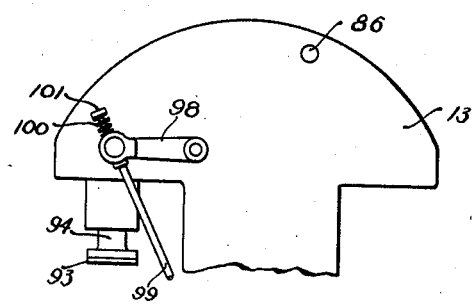
Figure 13:
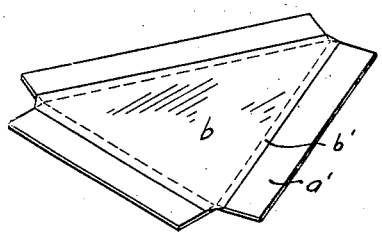
Figure 16:
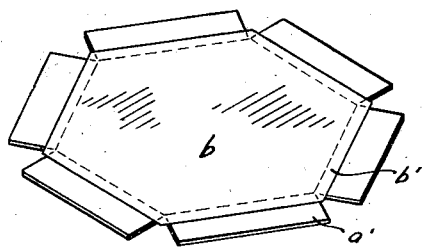
Figure 14:
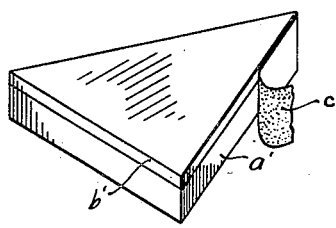
Figure 17:
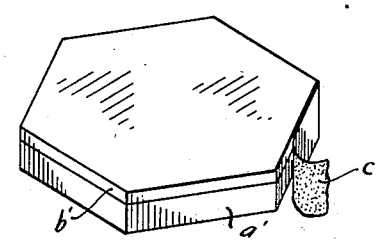
Figure 15:
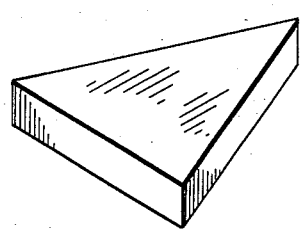
Figure 18:
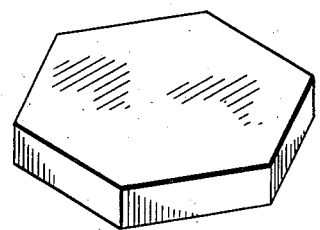

Fig. 12 shows the setting up device; Figs. 13 to 15 inclusive show the steps of the method when operating on a triangular box and Figs. 16 to 18 inclusive show the same steps applied to a hexagonal box.

Figure 6:
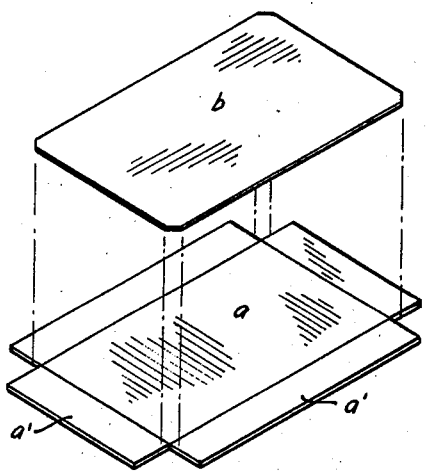
Figure 7:
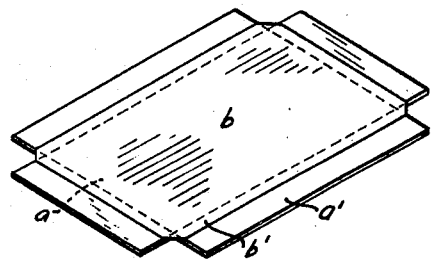
Figure 8:
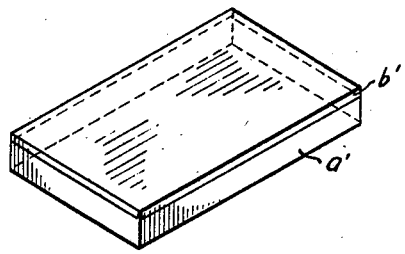

Referring first to Figs. 6 to 11 of the drawings, Fig. 6 illustrates the first step of the method, the letter $a$ indicating a box blank in flat condition, which blank comprises a main portion and a plurality of flanges indicated by the reference character $a^1$. The letter $b$ indicates a paper top or cover which is shown in this figure of the drawing as positioned some distance above the box blank and in position to be placed down upon the blank in proper superimposed relationship thereto. It will be understood that in moving the top $b$ from a supply or stack of tops it is passed over any suitable gumming or other adhesive applying member to coat the underside thereof with adhesive. While the adhesive is still in moist condition, the top $b$ is moved downwardly from the position shown in Fig. 6 into contact with the flat box blank $a$, and in proper superimposed relationship thereto, pressure being applied to cause the gummed side of the top $b$ to adhere to the flat blank. It will be noted that, as shown in Fig. 7, the marginal portions of the top $b$ extend over and in engagement with a portion of the four flanges $a^1$ of the box blank. After the box blank and top have been assembled in flat condition as shown in Fig. 7, the setting-up of the box shell or the bending over of the flanges $a^1$ at right angles to the main portion of the blank is then performed. It will be understood that the box blank is provided with scored folding lines to facilitate the setting-up of the flanges. This setting-up is performed according to the present invention, as hereinbefore pointed out, before the adhesive has set and while the said adhesive is sufficiently moist to permit the marginal portions $b^1$ of the top to slip or shift under the tension produced in the top by the bending over of the flanges $a^1$. The box blank in its set-up condition is illustrated in Fig. 8 of the drawings.

Figure 9:
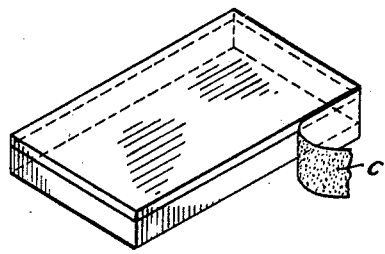
Figure 10:
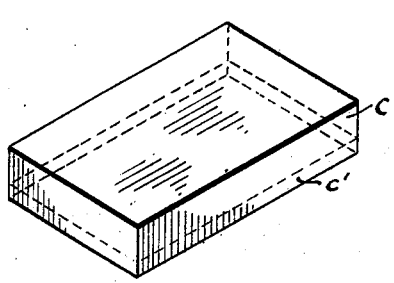
Figure 11:
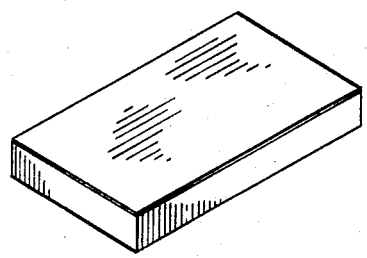

The next step of the process is to apply the binding strip indicated by the reference letter $c$ in Fig. 9 of the drawings. The showing of this figure illustrates the strip partially applied to the box flanges. Fig. 10 of the drawing indicates the condition of the box shell after the binding strip has been applied to all four of the box flanges. In Figs. 9 and 10 the binding strip $c$ is of the type wherein the lower edge, as shown in the drawings, is inturned upon the inner faces of the flanges. As clearly shown in Figs. 9 and 10 a marginal portion of the strip $c$, as indicated by the reference character $c^1$, projects below the outer edges of the box shell flanges $a^1$. This marginal portion $c^1$ is then folded about said outer edges and into the interior of the box shell. The inner surface of the binding strip is coated with adhesive before it is applied to the side flanges and when the marginal portion $c^1$ is turned inwardly about the edges of the flanges, the gummed side thereof is pressed into engagement with the inner faces of the box flanges so that when the inturning operation is completed the finished product appears as shown in Fig. 11 of the drawings.

The apparatus shown in Figs. 1 to 5 of the drawings consists of a number of simple mechanisms for performing the various steps of the method described above in connection with Figs. 6 to 11 of the drawings, said mechanisms being operatively associated to function in predetermined timed relationship. For convenience of description these mechanisms will be described under the following headings:

Box blank feeding and conveying means,
Top feeding and gumming means,
Setting-up mechanism and stripping mechanism.

*Box blank feeding and conveying means*

Figure 2:
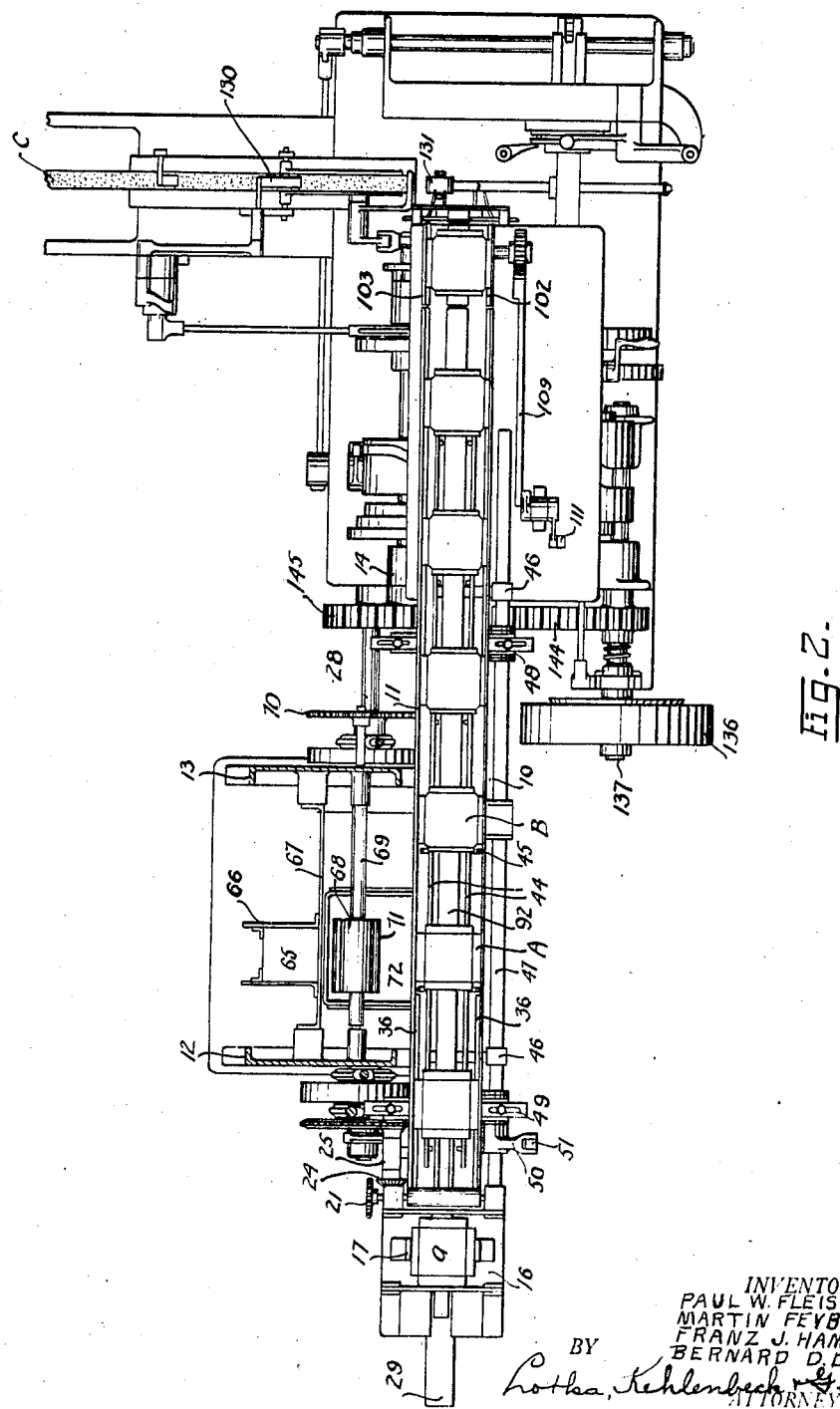
Figure 3:
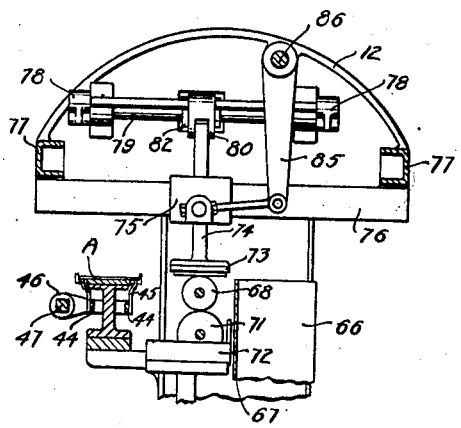
Figure 4:
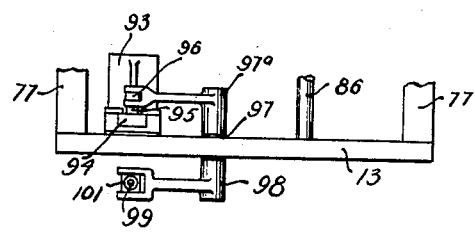

As shown in Figs. 1 and 2 of the drawings, the box blank feeding and conveying means comprises a pair of side rails or frame members 10 and 11 which extend longitudinally from the entrance to the delivery end of the machine. These rails are rigidly supported upon lateral extensions of the upright frame members 12 and 13, which carry the top feeding and gumming mechanism, and are also supported upon brackets 14 and 15 associated with the setting-up and box stripping machine. At the entrance end of the machine a magazine or hopper 16 is mounted adjacent to the ends of the side rails 10, 11, said magazine consists of a plurality of upright plates 17 between which a stack of top blanks $a$ are supported. Between the hopper 16 and the side rails 10, 11 is a pair of feed rollers 19, 20. The upper one of these feed rollers, namely, the roller 19, has a sprocket 21 secured thereto and said sprocket is driven by a chain 22 trained about it and a co-operating sprocket 23. The latter is driven by means of a beveled gear 24 mounted upon one end of a short shaft journalled in the bearing 25. The other end of said shaft has secured to it a sprocket driven by the chain 26. The chain 26 is driven by a sprocket 27 secured upon a cam shaft 28, said shaft being journalled in the frame members 12, 13 hereinbefore referred to.

Feeding of the box blanks $a$ from the magazine 16 to the feed rollers 19, 20 is accomplished by means of a reciprocating pusher 29 which is slidably mounted in the top face of a bracket 30 to which the plates 17 are secured. Reciprocation of the pusher 29 is effected through the intermediary of a connecting link 31 having one end thereof secured to a downwardly depending lug 32 integral with the pusher 29 and having its other end connected to an oscillating link 33 pivotally supported in the bracket 30. The link 33 is operated by a connecting rod 34, one end of which is connected to the lower end of the link 33 and the other end of which is connected to a link 35 presently to be more fully described.

It will be noted that the side rails 10, 11 are of angle shape in cross section so as to provide a pair of horizontal extending supporting ledges 36 upon which, as clearly shown in Fig. 2 of the drawings, the side edges of the box blanks are adapted to rest. These ledges 36 are located slightly below the plane in which lies the line of engagement of the peripheries of the rollers 19, 20 so that when a blank is delivered by the rollers 19, 20 it drops upon said ledges.

Extending into a groove formed at the center of the lower feed roller 20 is the upper end of an oscillating rod 37, the lower end of which has connected to it one end of a connecting rod 38. The other end of said rod 38 is pivotally connected to the upper end of an oscillating cam lever 39. This cam lever is pivotally supported between its ends, as at 40, and carries at its lower end a cam roller 41 which engages within a cam groove 42 formed in a cam 43 secured to the shaft 28.

Mounted between the side rails 10, 11 is a pair of spaced rails 44 from which, at spaced intervals, projects upwardly a plurality of pairs of blank feeding fingers 45. The rails 44 are secured to a pair of oscillating arms 46, the latter being fixed to an oscillating shaft 47 which extends in parallelism with the side rails 10, 11 and the rails 44, and which is suitably journalled in the bearing members 48, 49. Oscillating movement is imparted to the shaft 47 by means of a crank arm 50 having at one end thereof an apertured boss by means of which the arm is secured in fixed relationship to the shaft 47. The other end of the crank arm 50 has pivotally connected to it the upper end of a connecting rod 51, the lower end of which rod has operatively associated therewith a cam yoke 52, said yoke being provided with a cam roll 53 adapted to engage a cam groove in the sprocket 27.

Secured against longitudinal movement upon the shaft 47 but mounted thereon so as to permit relative rotation between it and said shaft, is a second crank arm 54. The outer end of this crank arm is pivotally connected to a connecting rod 55 which passes through an aperture in a connecting pin 56. The pin 56 is rotatably mounted in a pair of yoke jaws formed at the upper end of the lever 35 hereinbefore referred to, and springs 57, 58 are confined between said pin and nuts 59, 60. At its lower end the lever 35 carries a cam roller 61 which projects into a cam groove 62 formed in a cam member 63 secured to the cam shaft 28.

From the description of the above parts it will be seen that when the cam shaft 28 is rotated the cam yoke 52 will cause the shaft 47 to be oscillated by means of the connecting rod 51 and crank arm 50, thereby causing the rails 44 and fingers 45 which are secured to the shaft 47 by means of the arms 46, to be swung upwardly and downwardly to and from a position in which the fingers 45 will engage the box blanks. The timing of the cams 27 and 63 is such that when the fingers are in their uppermost position, in position to engage the box blank, the shaft 47 is shifted longitudinally from left to right (in the drawings) to cause the rails 44 to be similarly shifted, whereby the fingers 45 will cause the box blank to be slid along the ledges 36 and the plate 92, the longitudinal shifting of the shaft 47, rails 44 and fingers 45 being accomplished by the action of the oscillating lever 35, connecting rod 55 and crank arm 54. When the shaft 47 has been moved to its right hand limit of travel and during the dwell portion of said shaft's movement at the right hand end of the machine, the cam yoke 52 becomes effective to cause the fingers 45 to be lowered to a position below the ledges 36 and while the fingers are maintained in this lowered position the cam 63 functions to shift the shaft 47 from right to left back to its initial position at the end of which movement the cam yoke 52 again becomes operative to return the fingers 45 to their uppermost position. During the time the parts are moving rearwardly, that is, from right to left, the pusher 29 is actuated to cause the lowermost blank in the hopper 16 to be fed to the feed rollers 19, 20, said rollers engaging the blank and delivering it to the ledges 36. Just after the rear end of the blank passes from between the bight of the rollers, and before the fingers 45 have been returned to their rearward uppermost position, the oscillating lever 37 is caused to be actuated by the cam 43, the lever swinging in a clockwise direction and its upper end engaging the rear end of the blank which has just been delivered and pushing said blank forwardly of the machine to a position such that the pair of fingers 45 at the rear end of the machine will clear the blank as said fingers are moved upwardly into blank engaging position. As the rails 44 and fingers 45 are moved forwardly by the mechanism just described the rearmost pair of fingers will engage the rear edge of the blank and cause it to be fed forwardly through the machine along the ledges 36.

*Top feeding and gumming means*

The extent of travel of the shaft 47 and rails 44 is such that the blank which has just been fed from the hopper will be brought into position to receive a top *b*. A plurality or stack of tops are supported to one side of the blank feeding mechanism in a hopper indicated generally by the reference character 66, said hopper being suitably supported upon a cross tie 67 extending between and secured to the upright frame members 12, 13. Located between the blank feeding means and the hopper 66 is a gum applying device, which may be of any suitable construction, but which is shown as consisting of a gum applying roll 68 secured to a shaft 69 journalled in the uprights 12, 13. The shaft 69 is driven by a chain and sprocket drive 70, the driving member of which is secured to the shaft 28, and the driven member secured to the shaft 69. The periphery of the gum applying roller 68 is in engagement with a gum transferring roller 71 which dips into a supply of adhesive contained in a bath or tray 72.

The tops are transferred from the stack or hopper 66 by means of a suction feed head 73. This head is carried upon the lower end of a post 74 slidably mounted within a carrier 75. The carrier 75 is slidably mounted upon a rail 76 which extends above the gluing device and is secured at its ends to a pair of cross braces 77, the latter extending across between, and being secured to, the upright frame members 12, 13. The suction head 73 is moved vertically by means of a crank arm 78 secured to a shaft 79 and connected to the upper end of the post 74 by means of a short connecting link 80. The shaft 79 is oscillated in predetermined timed relationship with the movement of the rails 44 and fingers 45 by means of an actuating rod 81 the upper end of which is adjustably secured to a second crank arm 82 fixed to the shaft 79. The lower end of the rod 81 is operatively associated with a cam yoke 83 having a cam roll mounted thereon, and adapted to engage a groove in the cam 83ª secured to the cam shaft 28, said cam, as will be readily understood, causing said rod to be reciprocated to produce the required up-and-down movement of the post 74 and suction head 73.

Movement of the suction head 73 transversely to the rails 44 is effected by means of an oscillating lever 85 fixed at its upper end upon a shaft 86 and connected at its lower end by means of a connecting link 87 with the carrier 75. The shaft 86 is journalled in suitable bearings at the top of the frame members 12, 13 and has secured to its outer end a crank arm 88, to the outer free end of which is pivotally connected an actuating or connecting rod 89, the lower end of said rod being operatively associated with a cam yoke 90 having a cam roll mounted thereon and adapted to engage a groove in the opposite face of the cam 83ª secured upon the cam shaft 28.

The operation of the parts just described for removing and gluing the tops is as follows: During the time the rails 44 and fingers 45 are moving forwardly to move the blank a to the position indicated by the reference character A in Fig. 2 of the drawings, the suction head has been moved from a position in contact with the upper top of the stack thereof supported in the hopper 66 to a position immediately above the blank at position A. The movement of the suction head is a combined vertical and horizontal movement, the head first being moved upwardly by the action of the cam 83ª and parts 78, 79, 80, 81 and 82 to raise the uppermost top from the stack, the top being caused to adhere to the lower face of the suction head by means of the suction induced in said head through the hose connection 91 which it will be understood leads to any suitable source of suction. After the head has been moved upwardly it is caused to travel horizontally to carry the top across the upper surface of the glue applying roll 68 which applies a coat of adhesive to the underside of said top; the suction head then carries the gummed top to a position immediately above the blank at position A. It will be understood that the horizontal movement is imparted to the suction head by causing the carrier 75 to be moved along the rail 76 through the intermediary of the lever 85, link 87, shaft 86, crank arm 88 and actuating rod 89. Any suitable means may be provided at the station A for supporting the center of the blank so that when the suction head 73 is brought down into contact with the blank at said position, the gummed top 65 will be pressed firmly into contact with said blank. Such means has been shown as a plate 92 which extends from position A to beyond the position indicated by the reference character B.

After the top has been pressed into contact with the blank at position A, the suction head moves upwardly and then laterally to be returned to a position above the hopper 66 and to feed another top from the stack of tops contained in said hopper. As the suction head is moving rearwardly to feed another top, the rails 44 and fingers 45 are actuated to carry the blank from position A to position B. While the blank with the gummed top adhered thereto is at station B, a pressing device 93 is actuated to be brought down in contact with the upper face of said top to press the same firmly into engagement with the box blank. Said presser has an upwardly extending shank portion 94 slidably mounted in suitable guideways in a lateral extension (see Fig. 4) of the frame member 13. The shank 94 is provided with a laterally extending stud 95 to which is connected one end of a link 96 the other end of said link being loosely connected to a crank arm 97ª secured to a crank shaft journalled in a bearing 97 formed upon the upright frame 13. The outer end of said shaft has secured to it another crank arm 98 connected to an operating rod 99. At its upper end the rod 99 is resiliently connected by means of a spring 100 and nut 101 to said crank arm. The lower end of the rod 99 terminates in a yoke end with which engages a suitable cam mounted on the cam shaft 28.

After the blank is subjected to the action of the presser 93 it is moved step-by-step by means of the rails 44 and fingers 45 until it reaches the delivery end of the blank conveying means. At this end of the conveying means is provided a pair of short rail or side frame sections 102, 103. The construction of these sections is similar to that of the long rails 10, 11, that is to say, each of said short rails is of angular configuration in cross section to provide horizontal supporting ledges upon which the side edge portions of the flat blank are adapted to rest. These short rail sections are secured to a shaft 104 which shaft is journaled in an upwardly extending bracket 105 secured to a plate 106, the latter being supported upon the upper ends of the bracket members 14, 15. The shaft 104 has also secured to it a pinion 107 which meshes with rack teeth 108 formed in the outer end of a rack bar 109. The rack bar 109 is pivotally connected at its other end to one arm of a bell crank 110. To the other arm of said bell crank is pivotally connected the upper end of an operating rod 111; the lower end of the rod 111 is operatively engaged by means of the cam yoke 112ª with a cam 112 secured upon the cam shaft 113 of the setting-up and stripping mechanism presently to be described. It will be understood from the above description that the short rails 102, 103 will be moved from the full line position shown in Fig. 1 of the drawings to the dotted line position, such movement occurring after a blank has been moved to the delivery end of the blank conveying means. Guide fingers 114 are provided at the delivery end of the blank conveyor to direct the assembled blanks and tops downwardly to the setting-up mechanism.

*Setting-up and stripping mechanism*

The setting-up mechanism is located immediately below the guide fingers 114 and consists of a plate 115 having an opening therein of the proper size and shape for the finished boxes, said plate is provided with guide flanges 116 into which the assembled blanks and tops are directed by the guide fingers 114. It will be understood that the opening in the plate corresponds to the size and dimensions of the top portion of the box blank. A plunger or form 117 which has a size and shape corresponding to the final shape of the set-up boxes is mounted upon the forward end of a shaft 118. This shaft 118 with the former head 117 secured thereto is moved forwardly and rearwardly through the opening of the plate 115 by means of a cam lever 119. This cam lever is pivotally supported between its ends upon a pivot 120. The upper end of the cam lever terminates in a slotted or yoked portion 119ª with which is engaged a pin 121 projecting laterally from a bracket 122 secured upon the shaft 118. Between the slotted end of the cam lever 119 and its pivot 120 said lever is provided with a cam roller 123 which engages within a cam groove 124 provided in a cam 125 secured upon the cam shaft 113.

The face of the plate 115 opposite to that upon which the guide flanges 116 are mounted is provided with a plurality of projecting brackets 126 to which are attached a number of resilient fingers 126ª and brushes 127. As the plunger 117 is operated by means of the cam 125 and associated parts to pass through the hole in the plate 115, it will be understood that the flange portions $a^1$ of the blanks $a$ will be bent upon the score lines provided in the blank to the position shown in Fig. 8 of the drawings, thus performing the setting-up operation. As the plunger or former 117 continues its movement through the plate 115 the brushes 127 engage the marginal portions $b^1$ of the top $b$ with a wiping action that causes the said marginal portions to be maintained in their adhesion to the marginal blank portions $a^1$. As this wiping action of the brushes is applied to all four box flanges simultaneously with the folding of the flanges to the set-up position it will be seen that the top portion of the top $b$ is placed under tension thereby removing any wrinkles or creases in said top portion and drawing the same in a smooth flat condition upon the blank.

Movement of the plunger in the forward direction is continued until the set-up box blank is brought into alignment with the box stripping mechanism. The constructional details of the box stripping mechanism are substantially the same as shown in the patent to Feybusch and Severson hereinbefore referred to and therefore these parts will be but briefly described in the present application. The stripping mechanism consists of an intermittently actuated paper feeding device 130 which engages in proper timed relationship with the paper strip $c$ to push said strip forwardly in position below the former 117 with the set-up box carried thereon, the end of the strip projecting between said box and a roller 131. This roller is actuated to press the end of the strip into engagement with a side flange of the box, after which the shaft 118 is rotated a complete revolution the roller 131 remaining in contact with the stripped box until the revolution of the former and shaft has been completed. Before the strip $c$ passes to the intermittent feeding device 130 its upper face receives a coating of adhesive and the contact of the roller 131 with the lower face of the strip causes the gummed side of the strip to be secured to the outer faces of the box flanges $a'$.

The shaft 118 and plunger 117 then advance forwardly and the set-up box is deposited in a folding mechanism 135 which includes a plurality of folding members that operate automatically, first to turn the projecting marginal portion $c'$ of the strip $c$ at right angles to the box flanges and then to turn said marginal portions inwardly into contact with the inner faces of the box flanges thereby causing the inturned marginal portions to adhere to said inner faces of the box and complete the finished product shown in Fig. 11 of the drawings. The folding mechanism just referred to is described more fully in the hereinbefore mentioned patent.

The power for driving the apparatus may be supplied from any suitable source of power, such for example, as an electric motor or a line shaft. In either case a belt is trained from the source of power about the pulley 136 mounted upon the driving shaft 137, said pulley has incorporated therewith a disengageable clutch 138 which is normally held in operative driving engagement by means of a spring 139. Disengagement of the clutch against the action of the spring 139 is effected through a clutch shifting lever 140 connected by means of the connecting rod 141 with a manually operable handle 142, the connection of the rod 141 to the handle 142 being such that when the handle is thrown to its full limit of movement for disengaging the clutch, the pivotal connection between the rod and handle will be thrown past dead center to lock the handle in the clutch-out position.

The driving shaft 137 has secured thereto a spur gear 143 which meshes with a gear 144 secured upon the cam shaft 113 of the box stripping and folding mechanism. The gear 144 is also in mesh with a gear 145 upon the cam shaft 28 of the top feeding and gumming mechanism for driving the latter.

The manner in which the apparatus functions as a whole should be readily understood from the description of operation of each of the mechanisms hereinbefore recited in connection with the description of the construction and arrangement of the parts which comprise each of the said mechanisms. A brief description however will be given of the operation of the apparatus as a whole.

Let it be assumed that a stack of box blanks $a$ in flat condition are placed within the hopper 16 at the entrance end of the box blank feeding and conveying means, that a stack of tops $b$ are placed in the hopper 66 and that the stripping paper $c$ is threaded through the gumming mechanism (not shown) and intermittent feeding device 130 so that all three materials which are fed to the machine are in position to be engaged by their respective feeding means. The clutch 138 is thrown in to set the machine in operation. Engagement of the clutch 138 will cause the cam shafts 28 and 113 to be rotated. Rotation of the cam shaft 28 will cause the pusher 29 to be reciprocated to slide the undermost sheet of the stack of blanks $a$ into the bight of the feed rollers 19, 20. The rails 44 and the oscillating transfer rod or lever 37 are also actuated from the cam shaft 28 in proper timed relationship to the movement of the pusher 29. As hereinbefore pointed out, the transfer lever 37 engages the back end of the blank just after it passes from the rollers 19, 20 and while the rails 44 are moving from right to left. The blank is pushed forwardly to a position such that, as the rails 44 rise to their uppermost position, the pair of fingers 45 at the extreme left end of the machine move up behind the back of the blank and in position to engage the blank and push it forwardly through the machine as the rails are moved from left to right. The movement of the rails continues from left to right until the blank is moved to the position or station indicated by the reference character A. While the pusher 29 and blank feeding means are operating to advance the blank from the hopper to the position A, the suction head 73 is operating to remove the uppermost top $b$ from the stack in the hopper 66, the head first lifting the blank a slight distance and then carrying it horizontally across the top of the gum applying roll 68, and, when the head has travelled horizontally just above the blank at station A, it then moves downwardly to press the gummed side of the top firmly into contacting engagement with the uppermost side of the blank at station A. During the time the suction head is pressing the top upon the blank the rails are moving downwardly and rearwardly to engage the next blank which, in the meantime, is being taken from the hopper 16. The pressing operation of the suction head just referred to is of but slight duration, the suction then being interrupted and the head then moving up and travelling back to its position over the stack of tops in the hopper 66. In its return movement the suction head obvious'y is maintained a sufficient distance above the top of the roller 68 so that the under face of the suction head will not receive a coating of adhesive. Assuming that a number of blanks have been fed to the blank feeding means and are located at spaced distances along said means as shown in Fig. 2 of the drawings and that there is a blank at station B during the time the operations above described have been taking place, the presser 93 at station B is brought down into engagement with the blank at such station simultaneously with the pressing engagement of the suction head at station A and while no feeding action is being performed by the rails 44 and fingers 45.

In the meantime the mechanisms at the delivery end of the machine are also operating in timed relationship to perform the setting-up, the stripping and the inturning operations. A box blank with a top adhesively secured thereto having been delivered to the plate 115 in position to be operated upon by the plunger 117, the plunger 117 moves the box through the plate to bend the flanges thereof perpendicular to the top portion of the box and the plunger rotates to perform the stripping operation and to insert the set-up box into the folding mechanism 135. The plunger 117 moves rearwardly to return to its initial position during the time the rails 44 are moving rearwardly. At the same time the folding mechanism which comprises a plate, as more fully set forth in the Feybusch et al patent, is transferring the box to a position to be engaged by the devices which turn in the projecting marginal portion $c'$ of the strip c and as the operations of applying the top at station A, pressing the top to the blank at station B and setting-up and stripping the blank are being performed, the folding mechanism 135 is also operating simultaneously to perform the inturning operation. It will thus be seen that the apparatus comprises a number of simple mechanisms that operate automatically in predetermined timed relationship to perform the complete series of steps which comprise the method or procedure of the present invention, the three materials which are associated to construct the box in its final form all being fed to the machine in flat condition and the machine operating entirely automatically without requiring any hand operations to be performed. The machine can therefore be operated by a relatively unskilled operator as the duties of the operator are limited to maintain a supply of blanks and tops in the hoppers 16 and 66 respectively and also to maintain a supply of stripping paper in the means which feed the paper to the intermittent feeding mechanism 130.

While the apparatus above described represents a satisfactory and practical construction which has proven successful in commercial operation, it will be understood that the principles of the invention are not limited to the specific constructional details of any of the various mechanisms which perform the several steps of the method herein disclosed but that many changes, variations and modifications of the constructional details of such mechanisms may be resorted to without departing from the principles of the invention. For example, although the apparatus as above disclosed is intended for operating on box blanks which are fed automatically preferably in a flat condition, it will be obvious that the apparatus is not limited in its use to flat blanks but that it could be used for finishing boxes fed to the machine in set-up condition, in which case the hopper 16 and feed rollers 19, 20 would be removed and the set-up boxes delivered to intermittent conveyer 44, 45 by the pusher 29 to which the boxes would be fed directly from a setting-up machine. The construction of all of the other mechanisms which make up the complete apparatus is such that they will function in the same manner upon set-up boxes as upon flat blanks, but very slight changes in the constructional details of but a few of the various mechanisms being required to adapt the machine for operating on the set-up type boxes.

We claim:

1. In an apparatus for making covered paper boxes, a hopper for containing a stack of box blanks in flat condition, each of said blanks having a top portion and side wings, a hopper for containing a stack of paper tops, an intermittently actuated endless conveyer, which carries the blanks successively to a plurality of operating stations, means for feeding the blanks to said conveyer, a top feeding means at one of said operating stations actuated simultaneously with said blank feeding means, for feeding a top from its stack, for carrying said top across an adhesive supplying device to coat the under surface thereof with adhesive and for giving a preliminary pressing of said surface into engagement with a blank, a pressing device at the next operating station for pressing said top firmly upon said blank, and a setting-up mechanism for folding the wings of said blank to box form located at the delivery end of said conveyer and to which the assembled blanks and tops are automatically delivered, said setting-up mechanism operating simultaneously with said blank feeding means and said pressing device, but with respect to each blank at a predetermined time interval after the application of the top to the blank such that the adhesive coating of said top is in a tacky condition.

2. An apparatus as set forth in claim 1 in which said setting-up mechanism includes means for engaging the entire marginal portions of the top and pressing said portions with a wiping action against the side wings of the blank and towards the edges thereof as the latter is folded into box form.

3. An apparatus as set forth in claim 1 with which is combined a box stripping mechanism which operates immediately after the bending up of the side wings of the blank to apply adhesively a strip of binding paper about the sides of the formed box with a marginal portion of said strip projecting beyond the outer edges of said sides, and a turning-in mechanism operating immediately after said stripping mechanism which turns said marginal portion about said outer edges and presses it into adhesion with the inner surfaces of said sides.

4. An apparatus as set forth in claim 1 in which said setting-up mechanism includes means for engaging the marginal portions of the top and pressing said portions with a wiping action against the side wings of the blank and towards the edges thereof as the latter is folded into box form and with which is combined a box stripping mechanism which operates immediately after the bending up of the side wings of the blank to apply adhesively a strip of binding paper about the sides of the formed box with a marginal portion of said strip projecting beyond the outer edges of said sides and a turning-in mechanism operating immediately after said stripping mechanism which turns said marginal portion about said outer edges and presses it into adhesion with the inner surfaces of said sides.

5. In an apparatus for making covered paper boxes, a conveyer, means for feeding a box blank in flat condition and having a top and side wings from a stack thereof to said conveyer, said conveyer being provided with supporting means for said blanks and with means for intermittently engaging said blanks and advancing them along said supports successively to a plurality of operating stations, said blank feeding means being located adjacent to one end of said conveyer, a top feeding and gumming device extending in registry with said conveyer at the first operating station for removing a paper top from a stack thereof, for coating one surface of said top with adhesive and applying the coated surface of said top to said blank at said first station while said blank is in a flat condition on said conveyer, a presser located at the second operating station for firmly pressing said top against said blank, a setting-up mechanism located adjacent to the delivery end of said conveyer for folding the side wings of the assembled blank and top into box form and means for transferring the assembled blank from said conveyer to said setting-up mechanism.

6. In an apparatus for making covered paper boxes, a box forming mechanism comprising a former plate, having an opening with an outline of the shape of the box, a former head co-operating with said plate to fold into box form the side wings along the entire outline of a flat box blank assembly consisting of a blank having a top and side wing portions and a paper top adhesively secured thereto with the marginal portion of said paper top extending over the entire top portion of the blank and over a portion of the side wings thereof, means for actuating said former head to cause it to push the flat blank assembly through the opening of said plate and thereby bend the side wings thereof along the entire outline of the box blank to lie substantially perpendicular to said top portion, and means for exerting a wiping pressure on the marginal portion of said paper top as said side wings are being bent.

7. In an apparatus for making covered paper boxes, a conveyer and means for imparting a step-by-step motion thereto, said conveyer being adapted to carry and simultaneously advance a plurality of paper box blanks, a hopper for supporting a stack of flat paper tops each of a greater area than a box top, means actuating in timed relationship with said conveyer for removing a top from the stack thereof for supplying a coating of adhesive to one side of said top and applying the adhesively coated side of said top to the top of said box blank while the latter is in a flat condition and means, operating at a predetermined time interval, after the application of the top to the blank, such that the adhesive coating of the top is in tacky condition, to wipe all of the marginal edges of said top down upon the sides of the box.

8. In an apparatus for making covered paper boxes, an endless conveyer and means for imparting a step-by-step motion thereto, said conveyer being adapted to carry and simultaneously advance a plurality of paper box blanks, a hopper for supporting a stack of flat paper tops each of a greater area than a box top, means actuating in timed relationship with said conveyer for removing a top from the stack thereof, for supplying a coating of adhesive to one side of said top and applying the adhesively coated side of said top to the top of said box blank means, operating at a predetermined time interval, after the application of the top to the blank, such that the adhesive coating of the top is in tacky condition, to fold the blank into box form and to wipe the marginal edges of said top down upon the sides of the box blank and mechanism for applying a covering strip to the sides of the box immediately after the operation of the wiping means.

9. In an apparatus for making covered paper boxes, a conveyer for advancing, in a flat condition, box blanks each having a top and side wings, mechanism for feeding a paper top to a flat box blank at a point of the path given to said blank by said conveyer, means for gumming such top on its way to contact with the flat blank, a setting-up mechanism for folding the side wings of the assembled box blank and top into box form, and a presser for pressing the box blank and the top together, said presser being located between said setting-up mechanism and the point at which the box blank and the top are brought in contact, whereby the presser will act on the top and on the box blank while the latter is still in its flat condition.

In testimony whereof we have hereunto set our hands.

PAUL W. FLEISCHER.
MARTIN FEYBUSCH.
FRANZ J. HAMMER.
BERNARD D. DANS.